United States Patent [19]
Stubbs

[11] Patent Number: 5,326,202
[45] Date of Patent: Jul. 5, 1994

[54] TIE DOWN SYSTEM FOR MOTORCYCLES

[76] Inventor: Kent A. Stubbs, 2040 Stonybrook Dr., Red Bluff, Calif. 96080

[21] Appl. No.: 130,781

[22] Filed: Oct. 4, 1993

[51] Int. Cl.⁵ .............................................. B60P 7/00
[52] U.S. Cl. ...................................... 410/3; 24/17 A; 410/96
[58] Field of Search ...................... 410/96, 97, 98, 100, 410/10, 11, 12, 23, 3; 414/462; 24/17 A, 17 B, 115 M, 300, 68 CD; 224/42.03 A, 42.03 B, 42.07; 280/393, 395

[56] References Cited

U.S. PATENT DOCUMENTS

| | | | |
|---|---|---|---|
| 3,760,965 | 9/1973 | Chandler | 414/462 |
| 4,243,243 | 1/1981 | Edmisten | 410/3 X |
| 4,441,736 | 4/1984 | Shedden | 410/3 X |
| 4,842,458 | 6/1989 | Carpenter | 410/103 X |
| 4,852,779 | 8/1989 | Berg | 410/3 X |
| 5,123,802 | 6/1992 | Bell | 224/42.03 B X |

Primary Examiner—Michael S. Huppert
Assistant Examiner—James Eller
Attorney, Agent, or Firm—William S. Bernheim

[57] ABSTRACT

A strapping system for maintaining a motorcycle in an upright position during transport including two interconnected straps with cuffs engaging the grips of the handle bars.

2 Claims, 1 Drawing Sheet

TIE DOWN SYSTEM FOR MOTORCYCLES

BACKGROUND OF THE INVENTION

1. Field of the Invention

The invention relates to a strapping system for securing motorcycles in an upright condition for transport.

2. Description of the Art

Transport of motorcycles on trailers or in the back of pickups presents several problems. During transport vibration and bumps make it essential that the motorcycle be secured in some fashion to prevent the bike from falling over. Motorcycles have become very expensive to purchase and many are decorated to the point of being pieces of art.

Motorcycles are two wheel vehicles. The center of gravity and weight leave an owner with a difficult task if the motorcycle should fall over. Returning the bike to an upright position can require lifting with a jack or several individuals. Also in the fall, damage can be easily done to the exterior paint and chrome.

Present strapping systems leave much to be desired. One method is to tie the bike down by using two separate ropes, one from each handlebar. This often leads to damage to the handle bar covering from chaffing. Another problem is the difficulty in trying to distribute the weight equally to the tie downs. Thus, the bike is invariably not exactly upright which adds to instability and more movement. Added tie downs often contact the surface of the gas tank which frequently are decoratively painted. Padding is needed to prevent chaffing and damage to the tank's paint.

OBJECTS OF THE INVENTION

It is an object of this invention to provide a new system of securing motorcycles during transport, to reduce damage and to provide greater stability.

Other objectives, advantages and novel features of the invention will become apparent to motorcycle owners upon examination of the invention and the accompanying drawings.

SUMMARY OF THE INVENTION

Brief Description of the Figures

Further objectives and advantages of the invention will be apparent from the following detailed description, taken in conjuction with the accompanying drawings illustrating a preferred embodiment of the invention. The drawings are.

DETAILED DESCRIPTION OF A PREFERRED EMBODIMENT

Figure 1:
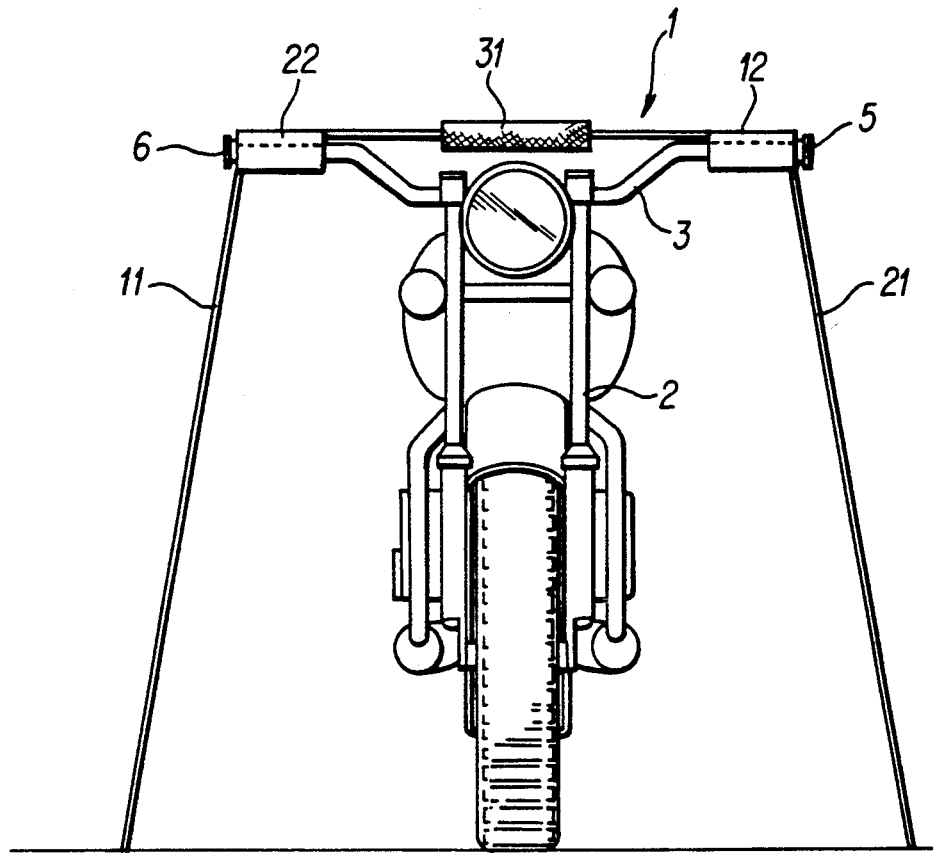
FIG. 1 schematically shows a tie down system according to the invention as it would be attached to a motorcycle.

In FIG. 1, a tie down system in accordance with the invention is shown attached to a motorcycle 2. Motorcycles come in many sizes and shapes but all have some type of handle bar 3 arrangement with a left grip for rider's left hand and a right grip for the rider's right hand. In particular, there is no uniformity of handle bar 3 design or the distance of the grips and from the ground or from each other.

The tie down system includes a first securing strap 11 having at a first end a first grip cuff 12 and at the other end a securing means 13. Interconnecting with the first securing strap 11 is a second securing strap 21 having at a first end a second cuff 22 and at the other end a securing means 23. The interconnection is provided by the first securing strap slidably passing through the second grip cuff 22 and the second securing strap 21 slidably passing throuh the first grip cuff 12.

Further a padding tube 31 slidably extends along and cylindrically encloses a portion of the first securing strap 11 adjacent to the first grip cuff 12 rand extends along and cylindrically encloses a portion of the second securing strap 21 adjacent to the second grip cuff 22. The padding tube 31 is not essential to operation of the invention but provides protection against chaffing damage if the straps 11 and 21 contact the motorcycle between the left and right grips in particular in those motorcycles in which the gas tank is mounted very high. A velour material or soft cotton is preferable.

Preferably, the first and second securing straps 11 and 21 are identical and interchangeable. In other words the first grip cuff 12 can be slipped over the left grip or the system reversed and the first grip cuff 12 slipped over the right grip.

Figure 2:
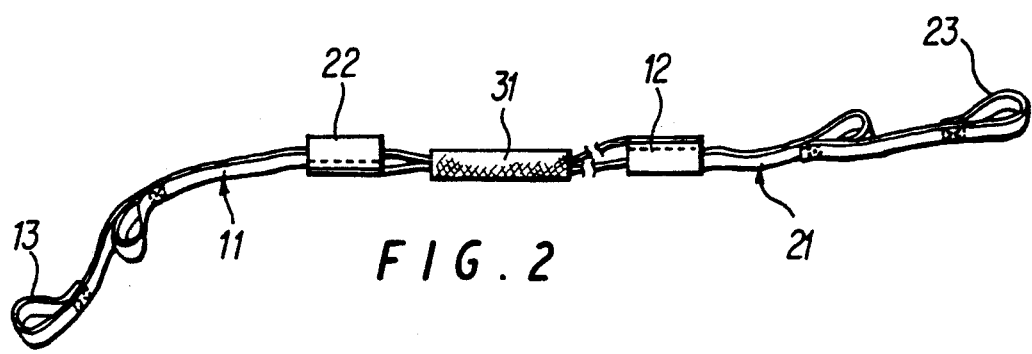
FIG. 2 is an enlarged not to scale view of the tie down system.

The securing straps 11 and 21, better seen in FIG. 2, can be fashioned from commercial grade rigging straps. These straps are typically 1¾ inches wide by 1/10 inch in depth and about 40 inches in overall length. Rigging straps come in various strength and 5,000 lb test should be more than sufficient.

The grip cuffs 12 and 22 are fashioned from commercial grade rigging straps. Rigging straps for this purpose of 5,000 lb test strength should be sufficient. For cuffs, 4 inch wide by 1/10 inch in depth by 8 inches in length is formed into a cylinder with a 1 ½ inch overlap and secured by sewing or the like to itself and to the first four inches of the first end of the strap. Thus the grip cuff is a 4 inch cylinder open at both ends which is about 2 inches in diameter and which can be slid over the end of the grip at the same time the other securing strap is also passing through the grip.

The securing means 13 and 23 are preferably provided by looping the end of the securing strap back on its self to form a loop and sewing the end to the strap. Further a second loop can be added by sewing one end of a short piece of strapping at the same time the first loop is sewn and looping the other end of short piece back on itself to form a second loop and sewing the end back to the short piece. These provide at least 2 convenient securing strap lengths.

In FIG. 1, the first grip cuff 12 has been slipped over the left grip and the first securing strap 11 extends across the center of the motorcycle to pass through the second grip cuff 22 which has been slipped over the right grip and from there down to the surface of a transport means such as a trailer or pickup bed at which location a loop of the securing means 13 is tied down.

Similarly the second grip cuff 22 has been slipped over the right grip and the second securing strap 21 extends across the center of the motorcycle to pass through the first grip cuff 12 which has been slipped over the left grip and from there down to the surface of a transport means such as a trailer or pickup bed at which location a loop of the securing means 23 is tied down.

The slideable grip cuffs 12 and 22 allow for easy attachment and deattachment of the tie down system to the motorcycle.

This invention should prevent damage to the motorcycle during transport. This method of placing the grip cuffs snugly over the grips of the handlebars provides a point from which the securing straps can be pulled taut.

In addition, the width of the grip cuff distributes the pull placed on the securing strap. This distribution prevents or minimizes the damage to the grip coverings.

I claim:

1. An apparatus for securing a motorcycle in an upright position during transport including in combination:
   a. a first securing strap having at a first end a first grip cuff and at the other end a first securing means with which to secure the motorcycle to a transport vehicle;
   b. a second securing strap interconnected with the first securing strap, the second securing strap having at a first end a second grip cuff, each of said grip cuffs comprising a cylinder open at both ends for placement of a motorcycle handlebar hand grip therein, and at the other end a second securing means; and
   c. the first securing strap interconnected with the second securing strap by way of the first securing strap slidably passing through the second grip cuff and the second securing strap slidably passing throuh the first grip cuff.

2. The apparatus of claim 1 wherein a padding tube slidably extends along and cylindrically encloses a portion of the first securing strap adjacent the first grip cuff and extends along and cylindrically encloses a portion of the second securing strap adjacent the second grip cuff.

* * * * *